(12) United States Patent
Ono et al.

(10) Patent No.: US 7,664,368 B2
(45) Date of Patent: Feb. 16, 2010

(54) INFORMATION RECORDING/PLAY-BACKING APPARATUS

(75) Inventors: Hiroaki Ono, Fujisawa (JP); Osamu Komoda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 752 days.

(21) Appl. No.: 11/367,382

(22) Filed: Mar. 6, 2006

(65) Prior Publication Data

US 2006/0222317 A1      Oct. 5, 2006

(30) Foreign Application Priority Data

Mar. 31, 2005      (JP) ............... 2005-100501

(51) Int. Cl.
    *H04N 5/91*      (2006.01)
(52) U.S. Cl. ........................ 386/52; 386/107
(58) Field of Classification Search ............. 386/46, 386/52, 55, 107, 117
    See application file for complete search history.

(56) References Cited

U.S. PATENT DOCUMENTS 4,740,828 A  *  4/1988  Kinoshita ............. 348/222.1

FOREIGN PATENT DOCUMENTS

| JP | 61-23379 | 9/1987 |
|---|---|---|
| JP | 1-94564 | 4/1989 |
| JP | 3-141073 | 6/1991 |
| JP | 5-54527 | 3/1993 |
| JP | 09-284715 | 10/1997 |
| JP | 10-105297 | 4/1998 |
| JP | 10-255380 | 9/1998 |
| JP | 10-268987 | 10/1998 |
| JP | 2000-357363 | 12/2000 |
| JP | 2003-189488 | 7/2003 |
| JP | 2003-199005 | 7/2003 |
| JP | 2004-159225 | 6/2004 |
| JP | 2004-235679 | 8/2004 |
| JP | 2004-349810 | 12/2004 |
| JP | 2005-11193 | 1/2005 |
| JP | 2005-37980 | 2/2005 |
| JP | 2006-059458 | 3/2006 |

OTHER PUBLICATIONS

"PC DOS J7.0V Commands Description and Messages" (Aug. 1995) First Edition, pp. 5-111 to 5-114, IBM Japan.

* cited by examiner

*Primary Examiner*—Huy T Nguyen
(74) *Attorney, Agent, or Firm*—Antonelli, Terry, Stout & Kraus, LLP.

(57) ABSTRACT

It is possible to save power in an HDD/optical disc combination camera. During a normal recording operated by a battery, only the hard disk is operated and operation of the optical drive is stopped. Alternatively, only the optical drive is operated and the operation of the hard disk is stopped. During dubbing, both of the HDD and the optical drive are operated when performing play-back/display during the dubbing and a large current is consumed. Accordingly, the operation is permitted only by external power supply. In the case of dubbing not performing play-back/display, the battery remaining amount is checked and dubbing is permitted only if the amount is equal to or greater than a threshold value.

4 Claims, 3 Drawing Sheets

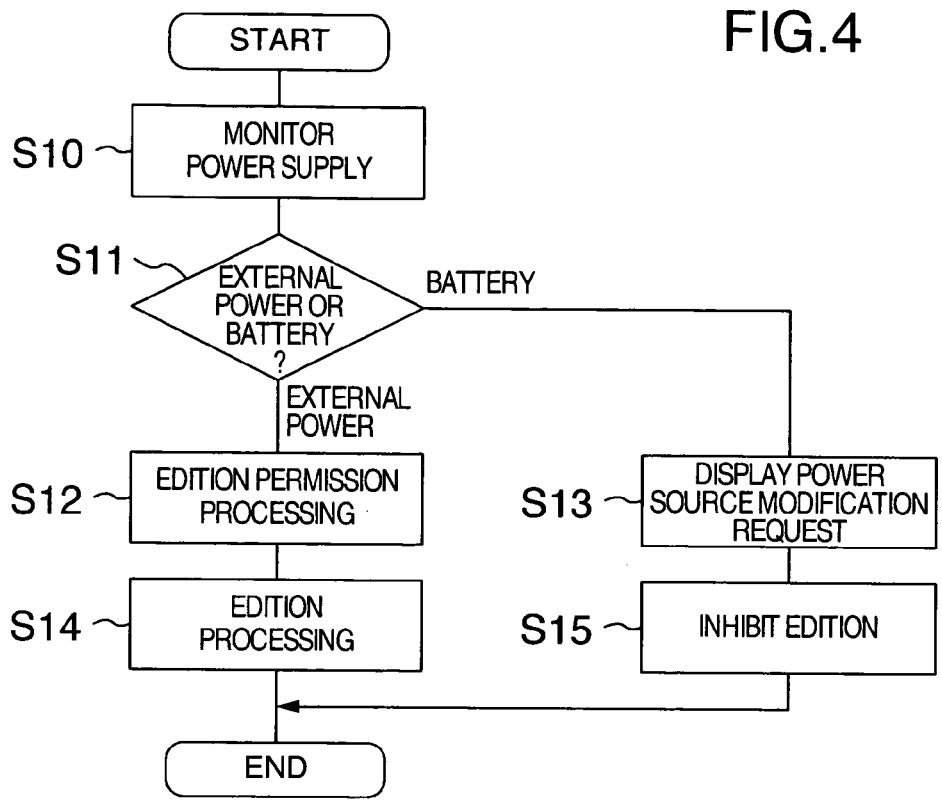
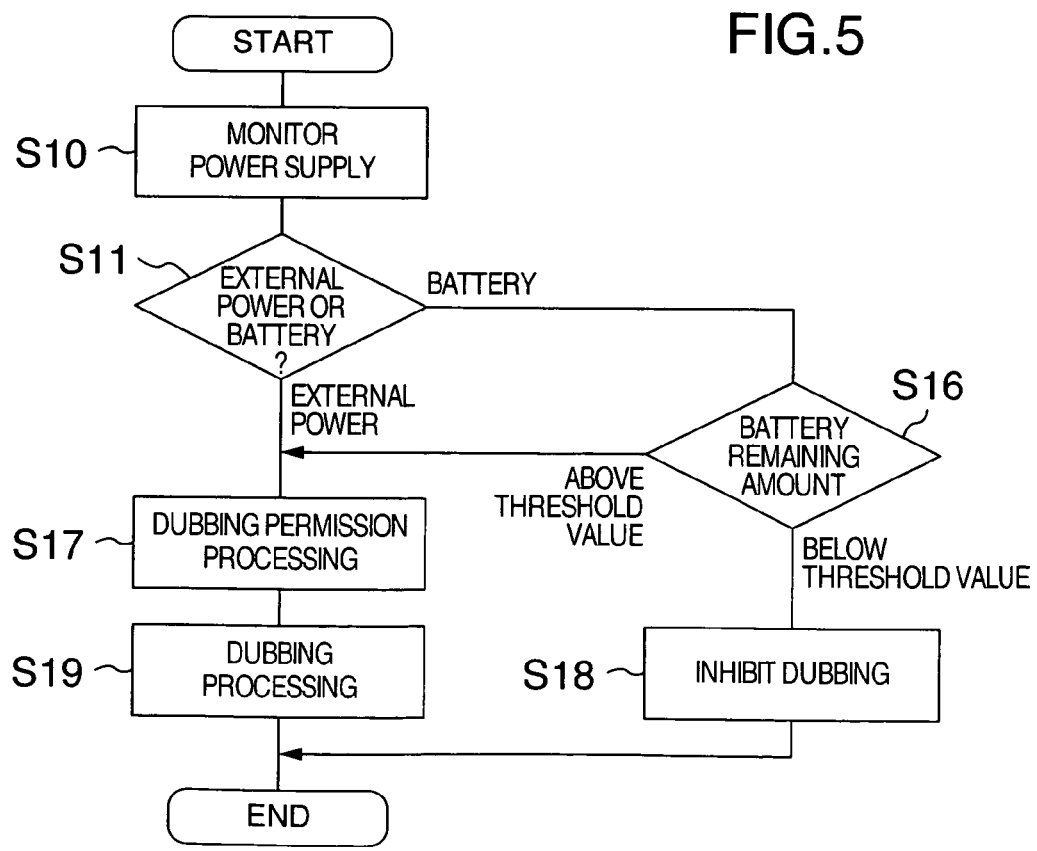

INFORMATION RECORDING/PLAY-BACKING APPARATUS

INCORPORATION BY REFERENCE

The present application claims priority from Japanese application JP2005-100501 filed on Mar. 31, 2005, the content of which is hereby incorporated by reference into this application

BACKGROUND OF THE INVENTION

The present invention relates to an information recording/play-backing apparatus.

The conventional technique provides, for example, a method for simultaneously recording video or audio data in a plurality of channels on an HDD (Hard Disk Drive) in an HDD recorder or a method for recording still image information by two compression methods in a digital camera or the like. For example, there is JP-A-09-284715.

Moreover, JP-A-2004-159225 discloses a method for performing dubbing by a recorder for a combination of a HDD and a DVD (Digital Video Disc) or stopping drive one of the HDD or the DVD by power saving.

SUMMARY OF THE INVENTION

Recently, video and audio in the world of video and audio information is digitized and the compression technique of the video and audio data has been significantly improved. A tape recording such as VTR (Video Tape Recorder) or VCR (Video Cassette Recorder) is being transferred to a disc recording such as a DVD and an HDD. As a representative of this transfer, there is an HDD & DVD hybrid recorder in which HDD and a DVD drive are mixed. For example, video or audio information from a broadcast station or an external input terminal is temporarily recorded on an HDD and after this recorded onto a DVD disc by backup when a user wants to store it. That is, so called dubbing is performed.

The hybrid recorder has been introduced onto a market by various companies and the market is expected to develop into a large size.

Here, a HDD has a capacity of 80 GB to several hundreds of GB. However, a DVD disc has a capacity of about 4.7 GB. The DVD may be, for example, a DVD-Video as an optical disc for video such as a movie and a DVD-ROM applied for recording application software, game software, various data for use by a computer. Alternatively, there is a rewritable optical recording medium using an optical disc such as a DVD-RAM, DVD±RW, DVD±R, and the like for backup-recording personal information or for a DVD recorder to replace the VTR. The aforementioned recorder temporarily records the video or audio data transmitted from outside on a hard disc and after this records it on a DVD disc for backup, thereby performing the so-called dubbing.

On the other hand, in the market of home camera, medium change from a tape recording to a disc recording has been started. A DVD camera using an 8-cm DVD disc or an HDD camera using a small-size HDD as a recording medium are introduced to the market by various manufactures.

However, the disc cameras have merits and demerits. For example, the DVD camera uses a removable medium and a recorded object can be kept as it is but the recording time is limited. For example, in the case of 8-cm DVD disc, the recording time is about one hour at the most per disc and a long-time recording cannot be performed. As for the HDD camera, an HDD depends on the capacity but it generally has a capacity greater than the 8-cm DVD disc by several times or several tens of times and can perform a long-time recording.

However, the capacity is limited and the recorded data should be re-recorded onto another medium to be stored, which lowers user-friendliness. Moreover, in either case of the DVD camera and the HDD camera, it is difficult to edit by using only one medium. In relation to this, like the HDD & DVD combination recorder, a small-size HDD may be put into the DVD camera. However, basically in the camera driven by a battery, if both of the HDD and the DVD are driven, the battery consumption becomes great and this is not realistic.

It is therefore an object of the present invention to provide a video or audio information recording/play-backing apparatus having both of an HDD which can be driven by a battery even when a small HDD is mounted on a DVD camera and an optical drive (for example, DVD or Blu-ray drive).

The aforementioned object may be achieved by the invention disclosed in claims.

The video or audio information recording/play-backing apparatus according to the present invention performs control to save power of the LCD for performing display and an HDD and an optical drive for performing recording which consume great power and stops power supply when there is no necessity.

The present invention can provide an information recording/play-backing device requiring a smaller power consumption.

Other objects, features and advantages of the invention will become apparent from the following description of the embodiments of the invention taken in conjunction with the accompanying drawings.

BRIEF DESCRIPTION OF THE DRAWINGS

FIG. 4 shows a sequence of an embodiment of the present invention.

FIG. 5 shows a sequence of an embodiment of the present invention.

DESCRIPTION OF THE EMBODIMENTS

Figure 1:
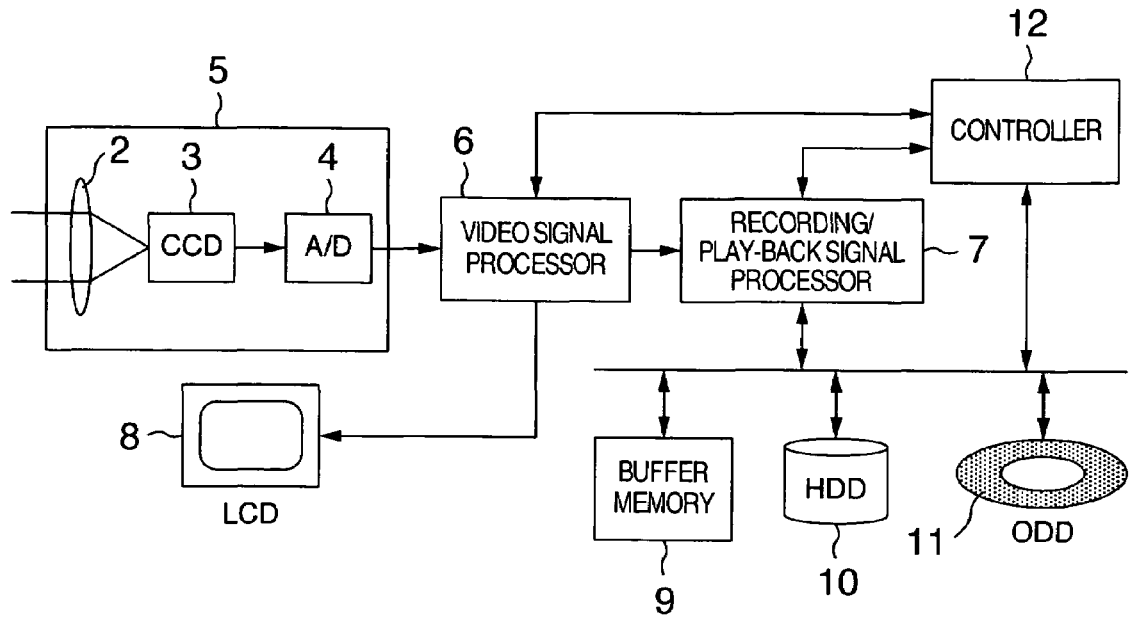
FIG. 1 is a block diagram of a system according to an embodiment of the present invention.
Figure 2:
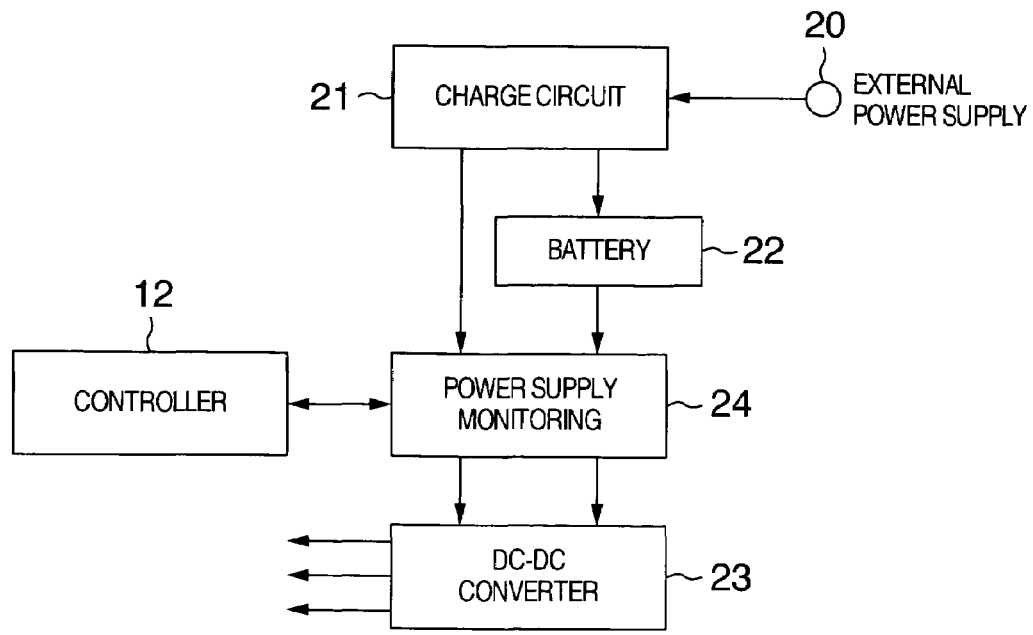
FIG. 2 is a block diagram showing a power supply method according to an embodiment of the present invention.
Figure 3:
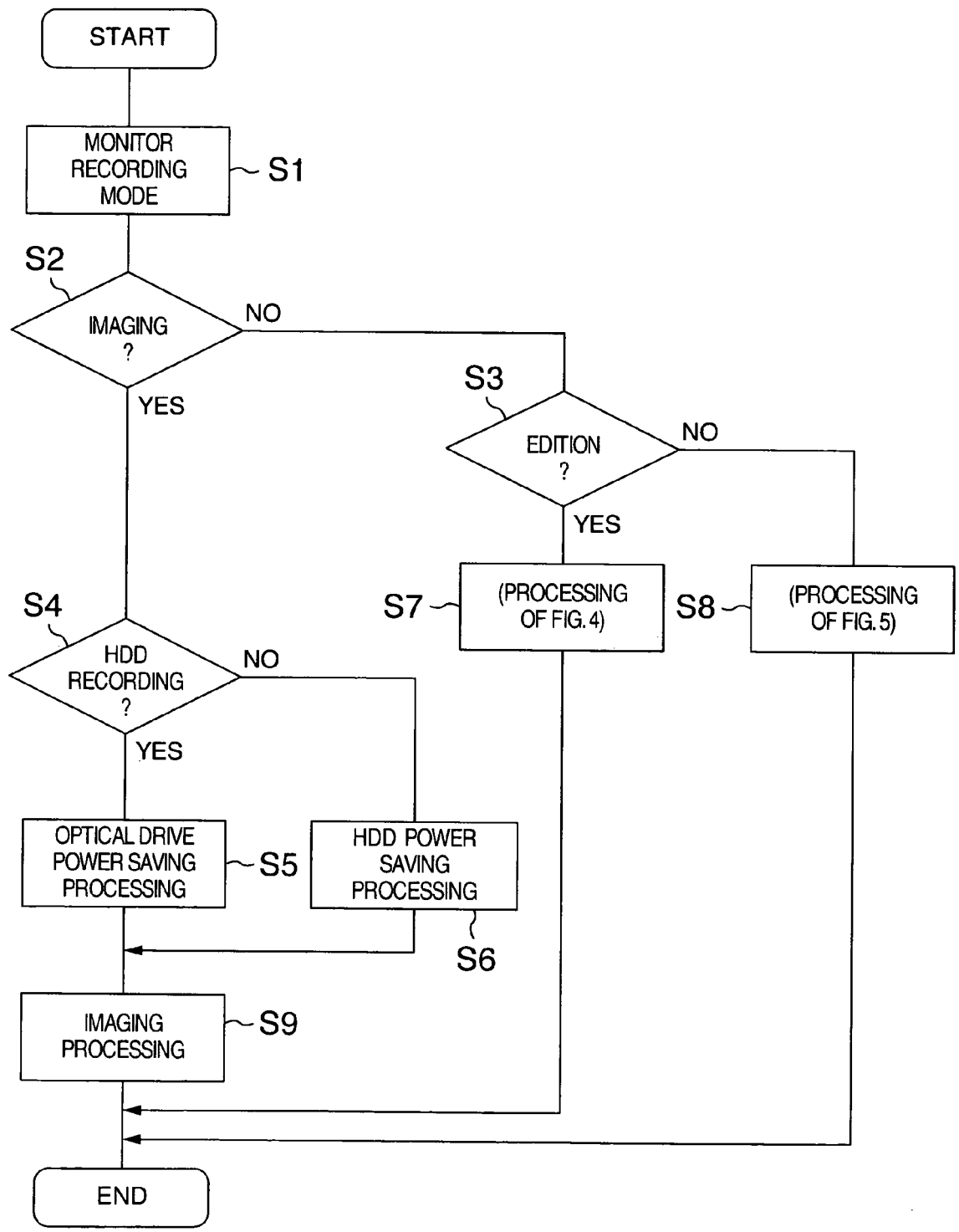
FIG. 3 shows a sequence of an embodiment of the present invention.

Description will now be directed to an embodiment of the present invention with reference to FIGS. 1, 2, and 3.

Embodiment 1

FIG. 1 shows an outline of the video or audio recording/play-backing apparatus 1 according to an embodiment of the present invention.

In FIG. 1, the imaging device 5 is formed by an imaging optical system 2, a CCD (Charge Coupled Device; imaging element), and an A/D converter 4. An object is image-formed on the CCD 3 by the imaging optical system 2. A video signal is obtained by the CCD 3 and digitized by the A/D converter 4 for output. A reference numeral 6 denotes a video signal processor for converting a video signal from the imaging device 5 to image data. The video signal processor 6 also processes an audio information signal from a microphone (not depicted) as audio information signal input device.

Moreover, during play-back, the video signal processor 6 converts the image data from recording/play-back signal processor 7 which will be detailed later into an image information signal for display output. Furthermore, the video signal processor 6 converts the audio data from the recording/play-back signal processor 7 into an audio information signal for audio output. In the case of a video camera, image data and audio data are continuously processed by the video signal processor 6. Here, the image quality and the audio quality are determined by the processing capability of the video signal processor 6. The processing capability determines the transfer rate of the data transmitted from the video signal processor 6 to the recording/play-back signal processor 7.

The recording/play-back signal processor 7 performs encode/decode processing, modulation/demodulation processing, ECC (Error Correction Code) addition/error correction processing, and the like in order to convert video data (including audio data) from the video signal processor 6 into recording data based on the recording format for recording onto an optical drive (ODD) 11 for recording onto an HDD 10 or a DVD as a disc-shaped recording device or a Blu-ray disc; or in order to convert the recording data reproduced from the ODD into the video data (including the audio data).

The transfer rate of recording or play-back onto/from the disc-shaped recording device is determined by the processing capability of the recording/play-back signal processor 7 and the disc-shaped recording devices 10 and 11. Numeral 9 denotes a memory for temporarily storing the video data (including audio data) from the video signal processor 7. Accumulation in the memory is performed when the transfer rate of the video data or the audio data transferred from the video signal processor 7 is faster than the speed of recording in the disc-shaped recording devices 10 and 11. Accordingly, recording in the disc-shaped recording devices 10 and 11 should be performed before the accumulation memory in the memory exceeds the memory capacity.

Numeral 8 denotes a video display device formed by an LCD (Liquid crystal Display) and the like. During play-back, the data from the disc-shaped recording devices 10 and 11 is temporarily stored in the memory 9 and converted into the original video data by the recording/play-back signal processor 7 and displayed by this video display device 8 via the video signal processor 6.

Numeral 12 denotes system controller formed by a control microcomputer supervising the entire device. This system controller 12 performs control of the respective units of the aforementioned devices and the entire system.

FIG. 2 shows configuration of power supply to the video or audio recording/play-backing apparatus 1 according to the present invention.

The power supply includes an external power input terminal 20, a charging circuit 21, a battery 22, a power supply circuit 23 (DC-DC converter), and power supply monitor 24. When power is supplied from the external power input terminal 20, the power supplied from the external power input terminal 20 is used to charge the battery 22 via the charging circuit 21.

While external power is supplied, power is supplied from the charging circuit 21 via the power supply circuit 23 to each block. When no external power is connected, power from the battery 22 is supplied to each block via the power supply circuit 23.

Here, the power supply monitor 24 serves as means for judging whether an external power supply is connected and the device is operated by the external power or by the battery 22 and transmitting the judgment result to the controller 12. In FIG. 2 the power supply monitor 24 is expressed as independent means. On hardware, however, when it is clear from which power is inputted and to which power is outputted such as to the power supply circuit 23 from the charging circuit 21, this can be used as monitoring means.

Here, explanation will be given on one embodiment indicating one feature of the present invention with reference to FIG. 3. Since this device is basically used outdoors such as a camera, reduction of power consumption is a significant problem. Depending on the camera recording mode, it is judged whether recording is performed on the HDD 10 or the optical drive 11 and according to the judgment result, power saving is set in each drive. Basically, the following three modes are available as camera recording modes.

That is, an imaging mode for actually imaging an object, an edition mode for editing the imaged information, and a dubbing mode for copying information from the HDD existing as a combination system of HDD & optical drive to the optical drive or from the optical drive to the HDD.

In step S1, the controller 12 judges in which state is the recording mode. Step 2 judges whether the mode is imaging mode. If Yes, control is passed to step S4, where it is judged whether the mode is recording onto the HDD or recording onto the optical drive 11. If the mode is recording onto the HDD 10, control is passed to step S5, where power supply to the optical drive side is suppressed or control is performed to set the optical drive to power saving mode.

When step 4 judges that the mode is recording onto the optical drive, control is passed to step S6, where power supply to the HDD is suppressed or control is performed to set the HDD to power saving mode. After this, actual imaging is performed in step S9.

When step 2 judges that the mode is not imaging mode, control is passed to step S3. In this case, the mode may be the edition mode or the dubbing mode. In either mode, the HDD 10 and the optical drive 11 are operating. Accordingly, power supply cannot be suppressed or setting to power saving mode cannot be performed. However, it is possible to modify the power supply method depending on whether the mode is the edition mode or the dubbing mode. This judgment is performed in step S3.

In step S3, if the mode is the edition mode, control is passed to step 7 (processing of FIG. 4) which will be detailed later. If the mode is judged to be the dubbing mode, control is passed to step 8 (processing of FIG. 5) which will be detailed later.

FIG. 4 shows detailed processing performed when step S3 in FIG. 3 judges that the mode is the edition mode.

Here, during an edition, information cut, movement and re-recording to the optical drive 11 are performed while checking information recorded, for example, on an HDD to be edited by using an LCD 8, which requires a large power consumption. Accordingly, the HDD 10, the optical drive 11, and the LCD 8 which are the three parts requiring large power consumption operate and accordingly, an external power source capable of supplying a sufficient power is basically required. On the contrary, when an edition is performed by using a battery, the battery consumption amount increases and it is expected that the battery capacity becomes zero in the middle of the edition. This is not preferable for the user and this should be prevented.

Step S10 in FIG. 4 judges whether the power supply for operating the device is from the battery 22 or the external power terminal 20. When step S11 judges that the device is operated by the external power supply, sufficient power supply can be obtained and step S12 permits edition processing so that edition can be performed.

After this, in step S14, the edition processing is performed. When the device is operated by the battery 22, step 13 requests the user to modify the power supply. More specifically, step 13 causes the LCD 8 to display "this operation cannot be connected to the battery. Connect the operation to external power supply." so as to prompt the user to input external power supply and step S15 performs edition inhibit processing, thereby terminating the processing.

FIG. 5 shows the detailed processing performed when step S3 in FIG. 3 judges that the mode is dubbing mode.

Here, for dubbing, information recorded on, for example, an HDD is simply copied to the optical drive 11. Basically, the LCD 8 need not be operated. Accordingly, only the two parts which requires a large power consumption are only two, i.e., the HDD 10 and the optical drive 11. Accordingly, when a certain battery capacity is assured, the recording can be performed.

Moreover, basically, the dubbing is not continuous dubbing of a plenty of discs. After recording is performed on a disc, the disc is replaced with another. The battery remaining amount should be checked for each of the discs. That is, the power consumption required for one disc need be considered. Accordingly, when a certain battery remaining amount is present, the dubbing can be performed by the battery drive.

Step 10 in FIG. 5 judges whether the power supply for operating the device is from the battery 22 or from the external power terminal 20, i.e., external power supply. When step S11 judges that the device is operated by the external power supply, sufficient power is supplied and step S17 permits dubbing so that dubbing can be performed. After this, step S18 performs dubbing.

When the power is supplied from the battery 22, step S16 checks the battery remaining amount. When the remaining amount is not smaller than a threshold value, step S17 permits dubbing processing so that dubbing is performed. When the remaining amount is below the threshold value, there is a high possibility that recording is stopped during the dubbing and step S18 performs dubbing inhibit processing, thereby terminating the processing. The battery remaining amount of step S16 may be performed by monitoring the battery use time or supply voltage from the battery.

Moreover, the dubbing permission processing of step S17 includes a process for stopping the power to the LCD 8 after the selection of the dubbing mode until the actual dubbing is started or the process to perform LCD power saving control. Depending on the battery remaining amount, the power saving control to reduce the LCD back light intensity may be performed when operating the LCD. Especially, when operated by the battery, the LCD back light intensity is reduced for power saving.

As has been described above, the video or audio information recording/play-backing apparatus according to the present invention performs power saving control of the LCD for performing display, the HDD and the optical drive for performing recording which requires a large power consumption and stops power supply when not required.

For example, when performing imaging outdoors which requires battery drive, imaging is performed while looking at the LCD. Accordingly, only the HDD is operated for recording and the operation of the optical drive is stopped. Alternatively, only the optical drive is operated and the operation of the HDD is stopped.

For example, during edition, a scene is selected from the information recorded on the HDD and recorded on the optical drive. Accordingly, a user usually looks at the display screen such as the LCD when performing the edition. That is, the LCD of the display device, the HDD, and the optical drive requiring a large power consumption are simultaneously operating. When only the battery is used for power supply, the battery capacity is significantly reduced. Accordingly, the operation is permitted only by using the external power supply.

For example, when play-backing/displaying for the condition check, i.e., when the LCD display is performed, a large current is consumed and accordingly, the operation is permitted only by the external power supply.

As has been described above, the present invention may be applied to the video or audio recording/play-backing apparatus such as a hybrid DVD camera using the combination of the HDD and the DVD or the Blu-ray camera which will soon be brought into the market.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A portable information recording/play-back apparatus comprising:
   an imaging module which images video information;
   a first recording/play-back module which records the video information into a first recording medium, or which plays-back the video information from the first recording medium;
   a second recording/play-back module which records the video information into a second recording medium that consumes larger power for recording/play-back than the first recording medium, or which plays-back the video information from the second recording medium;
   an external power source input terminal through which power is suppliable from outside;
   a battery;
   a display which displays the video information; and
   a controller which controls at least the imaging module, the display and the first and second recording/play-back module,
   wherein the controller judges whether the mode, controlling the first recording/play-back module and the second recording/play-back module, is: an imaging mode, controlling so that the first recording/play-back module or the second recording/play-back module records a video information imaged by the imaging module into the first recording medium or the second recording medium; or a dubbing mode, controlling so that the first recording/play-back module plays back a video information from the first recording medium and the second recording/play-back module records the video information, play-backed from the first recording medium, into the second recording medium; and
   wherein the controller controls so that:
   when the information recording/play-back apparatus is operating on the battery and recording is performed into the first recording medium in the state of the imaging mode, the operation to the second recording medium is stopped and the operation to the display is permitted; and
   when the information recording/play-back apparatus is operating on the battery and during the period when a dubbing operation is being performed in the state of the dubbing mode, the play-back of the video information from the first recording medium and the recording of the video information into the second recording medium are carried out and the operation to the display is stopped.

2. The portable information recording/play-back apparatus as claimed in claim 1, wherein said the controller controls so that when the information recording/play-back apparatus is operating on electric power from the external power source input terminal and during a period when a dubbing operation is being performed in the state of the dubbing mode, the play-back of the video information from the first recording medium and the recording of the video information into the second recording medium are performed and the operation to the display is permitted.

3. The portable information recording/play-back apparatus as claimed in claim 1, wherein the first recording medium is a hard disk, and the second recording medium is an optical disk.

4. The portable information recording/play-back apparatus as claimed in claim 2, wherein the first recording medium is a hard disk, and the second recording medium is an optical disk.

* * * * *

UNITED STATES PATENT AND TRADEMARK OFFICE
CERTIFICATE OF CORRECTION

PATENT NO. : 7,664,368 B2 Page 1 of 1
APPLICATION NO. : 11/367382
DATED : February 16, 2010
INVENTOR(S) : Ono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1015 days.

Signed and Sealed this

Thirtieth Day of November, 2010

David J. Kappos
*Director of the United States Patent and Trademark Office*